Oct. 10, 1961    L. C. SHRAMEK    3,003,806
DRUM LIFTER

Filed Oct. 20, 1958    2 Sheets-Sheet 1

Inventor
LADD C. SHRAMEK by Hill, Sherman, Meroni, Gross & Simpson Attys.

Oct. 10, 1961 L. C. SHRAMEK 3,003,806
DRUM LIFTER
Filed Oct. 20, 1958 2 Sheets-Sheet 2
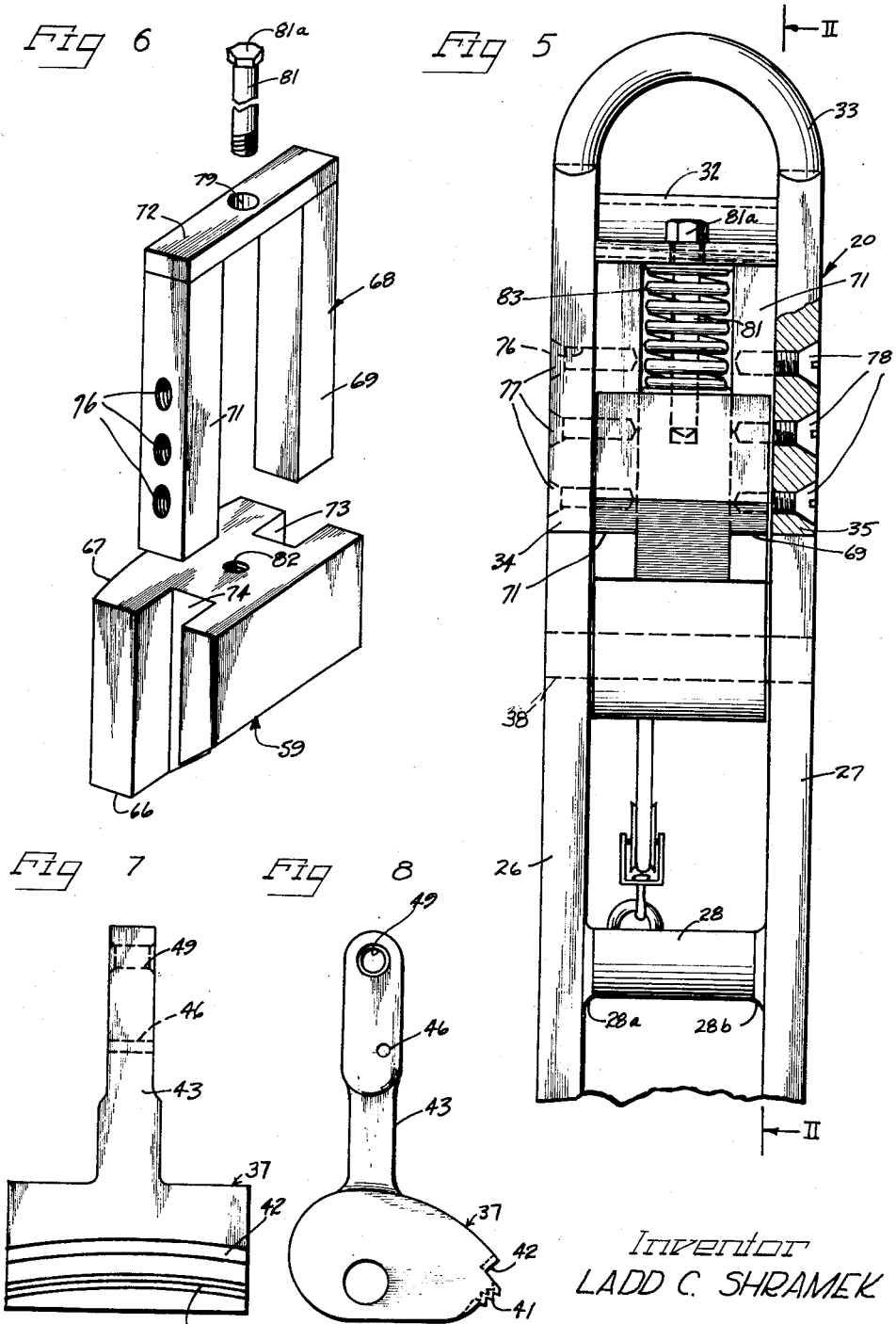
Inventor
LADD C. SHRAMEK
by Hill, Sherman, Meroni, Gross & Simpson Attys.

United States Patent Office 3,003,806
Patented Oct. 10, 1961

3,003,806
DRUM LIFTER
Ladd C. Shramek, 542 Monica Drive, Fairplain,
Benton Harbor, Mich.
Filed Oct. 20, 1958, Ser. No. 768,172
7 Claims. (Cl. 294—101)

The present invention relates to a lifting and transporting mechanism and is especially useful in connection with material handling apparatus such as transporting and elevating trucks. More particularly, the invention relates to a lifting and moving device with improved apparatus for gripping and holding articles such as barrels, drums and other containers having a peripheral edge which may be gripped.

Various mechanisms have heretofore been designed for the elevation and transportation of barrels and the like, but the devices have not met the full needs of such a mechanism in that they are frequently excessively complicated and limited to the handling of particular shapes of containers. Certain devices are capable of gripping barrels having a flanged peripheral edge of one shape but are not capable of gripping barrels having edges of different shapes or sizes. It is obviously important in handling mechanisms that the barrels be gripped securely to prevent yielding of the gripped edge and consequent dropping of the barrel.

Accordingly, it is a prime feature of my invention to provide a barrel handling mechanism which will grip the edges of barrels and obtain a maximum bite on the edge with maximum surface engagement eliminating the possibility of the edges of the barrels tearing loose and the barrel being dropped.

It is an object of the invention to provide an improved container lifting and transporting device capable of gripping barrels by their peripheral edges, which will grip barrels in a more secure and firm grip than devices heretofore used.

A further object of my invention is to provide a container lifting and transporting device which is particularly well adapted to handling barrels having a relatively shallow upstanding peripheral flange at their edge.

A still further object of the invention is to provide a container gripping mechanism capable of gripping the peripheral flanged edges of barrels wherein the flanges are of different sizes and shapes.

A still further object of the invention is to provide an improved container lifting and transporting device with mechanism which will automatically grip the peripheral flanged edge of a barrel when placed in gripping position over the barrel edge.

Yet another object of my invention is to provide a container lifting and transporting device wherein the weight of the container supplies a major portion of the gripping force thereby reducing any tendency for heavy containers to slip or fall.

Other objects and advantages will become more apparent with the disclosure of the preferred embodiment of my invention in the specification, claims and drawings, in which:

FIGURE 5 is a front elevational view of the gripping head;

FIGURE 6 is a detailed exploded view showing elements of one of the gripping members in perspective view and in detail;

FIGURE 7 is a detailed elevational view of another gripping member; and

FIGURE 8 is a side elevational view of the gripping member of FIGURE 7.

As shown on the drawings:

Figure 1:
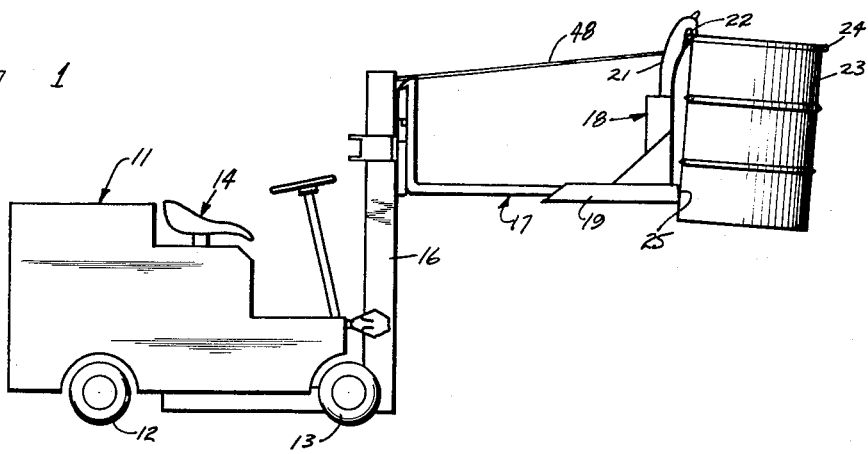
FIGURE 1 is a side elevational view of a lift truck combined with a gripping and hoisting mechanism embodying the principles of the present invention.

A power operated lifting and transporting truck 11 is illustrated in FIGURE 1, and is of well known construction. The truck is mounted on wheels 12 and 13, and the operator sits on a seat 14 to drive and operate the truck.

At the front of the truck is a vertical column 16 on which a fork 17 is slidably mounted and at the control of the operator will move up or down.

Mounted on the fork 17 is a barrel supporting assembly 18, having a base 19 for securing it to the fork 17.

The gripping mechanism 18 has a housing or head 21 at its upper end for gripping a flanged edge 24 of a barrel 23 by sliding the edge 24 into a slot 22 on the head. A surface 25 on the gripping mechanism 18 holds the barrel 23 upright. With the barrel thus gripped and supported it may be lifted and transported about on the lift truck 11.

The details of structure of the gripping head or housing 20 are illustrated in FIGURES 2 through 5 with the details of gripping members being shown in FIGURES 6, 7 and 8.

Figure 2:
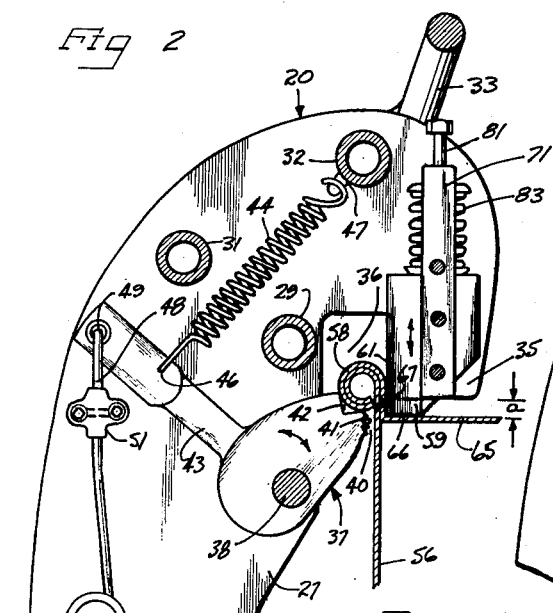
FIGURE 2 is a detailed vertical sectional view taken through a gripping head housing of the mechanism and taken substantially along line II—II of FIGURE 5.
Figure 3:
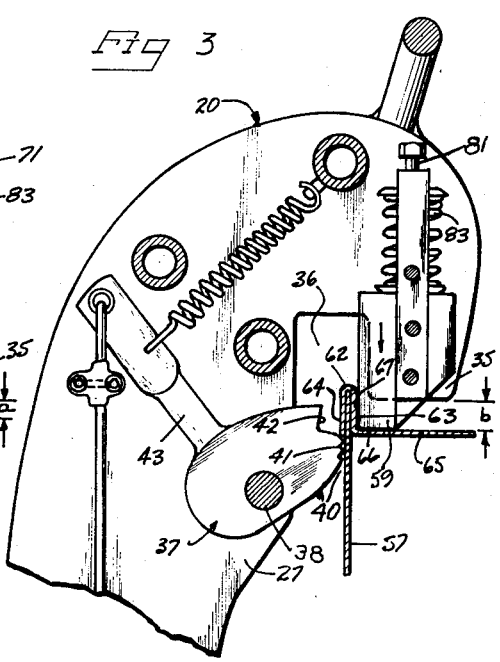
FIGURE 3 is a fragmentary detailed sectional view, similar to FIGURE 2, but showing gripping a barrel flange having a different shape.

The housing 20 includes a pair of side plates 26 and 27. The plates are hook-shaped as illustrated in FIGURES 2 and 3. The plates are secured to each other in spaced parallel upright relationship by spaced members 28, 29, 31 and 32. The spaced members are attached to the inner surface of the plates, preferably by welds at their ends, such as illustrated at 28a and 28b for the spacer 28. The spacers may be formed of tubes such as illustrated.

The plates are hook-shaped and have an outer downwardly extending hook end, 34 and 35. The hook end forms a guideway slot 36, in which the peripheral edge of a barrel is received to be gripped and supported.

At one side of the slot 36 is a first gripping member 37 which is illustrated in the form of a pawl pivotally supported on a pin 38 which is mounted at its ends on the plates 26 and 27.

At the other side of the throat 36 and facing the first gripping member 37 is a second gripping member 39 which may also be termed a holding member or tooth. The gripping members form a receiving throat 40 between them.

The gripping pawl 37 is shaped to have a first toothed gripping surface 41 and a second gripping notch 42. The surface 41 and notch 42 are positioned so that they will move toward a gripping position in the slot 36 or away from the gripping position to a release position out of the slot 36. The pawl 37 is shown in the gripping position in FIGURES 2 and 3 and is shown moving toward the gripping position in FIGURE 4, as will be described.

An operating arm 43 is connected to the pawl for pivoting it. The pawl is continually urged toward gripping position by a coil tension spring 44 which is connected at one end through an opening 46 in the arm 43 and at the other end is hooked through an eyelet 47 on the spacer 32.

A cable 48 is used to pivot the pawl 37 to release position. The cable is looped through an opening 49 in the arm 43 and the loop is secured by a clamp 51. The cable passes downwardly through a sheave assembly 52 which has a hook 53 connected in an eyelet 54. The cable 48 thus may be pulled by the operator to pivot the pawl 37 to release position.

Different barrels which must be handled by the lifting and transporting mechanism are illustrated in FIGURE 2 at 56 and in FIGURE 3 at 57. The barrel 56 has a top 56a and is provided with a peripheral upstanding turned edge in the form of a circular bead 58 with the bead having an inner face 61.

The barrel 57 has a top 65, and the top is not sealed to the barrel by a circular bead as it the case with the barrel 56, but instead a flat upstanding flange 62 is provided. The flange has an inner surface 63 and an outer surface 64. It will be apparent from the differences in these gripping flanges for the barrels 56 and 57 that a throat 36 must be provided which is sufficiently wide to accommodate the bead flange 58 and yet the gripping members must be operative to grip the thinner flat flange 62.

An important feature of the invention is the provision of the holding member or tooth 59 which reciprocates vertically and which is urged downwardly to engagement with the top of the barrel so as to afford a maximum purchase or bite on the barrel flange.

To this end, the holding member 59 has a surface 66 which faces downwardly or toward the open end of the slot. This surface engages the top 56a or 65, of the barrel, when the housing 20 is brought down over the edge of a barrel. The holding member 59 has an abutment face 67 which faces toward the slot, and which is illustrated in FIGURE 6 as being curved to conform to the inner surface 61 or 63 of the barrel flange.

The gripping surface 41 for the pawl 37 and the gripping notch 42 for the pawl are also curved to the general curvature of the flange of a barrel to be handled, as illustrated in FIGURE 7, for a maximum surface engagement with a barrel flange.

The holding member 59 is slidably supported for vertical movement on a forked slide support 68. This support 68 has side bars 69 and 71 with a cross bar 72 extending across the upper ends. The bars 69 and 71 are received by slots 73 and 74 which extend vertically down the sides of the holding member 59.

The bars 68 and 71 are secured to the inner surfaces of the housing side plates 27 and 26 respectively. The bar 71 is provided with threaded holes 76 which receive studs 77 to secure the bar 69 to the plate 27. The bar 68 is similarly secured to plate 26 by studs 78.

The holding member 59 is continually urged downwardly to a holding or gripping position. A hole 79 in the bar 72 receives a bolt 81 which is threaded into a hole 82 in the top of the holding member 59, FIGURE 6. Surrounding the bolt 81 is a coil compression spring 83 which is compressed between the bar 72 and the top of the holding member 59. The head 81a of the bolt 81 of course limits the downward movement of the holding member 59.

Figure 4:
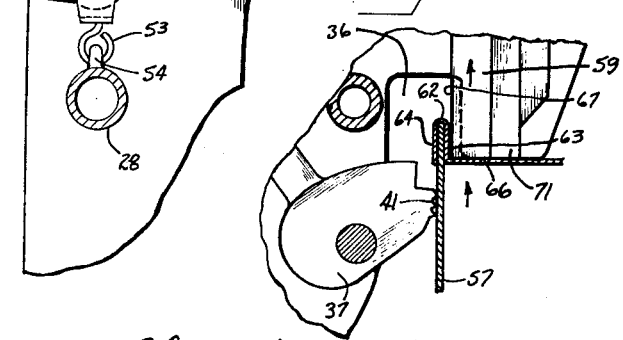
FIGURE 4 is a fragmentary sectional view, similar to FIGURE 3, and illustrating the action of the gripping members.

Operation of the mechanism can best be described with reference to FIGURES 3 and 4. To pick up a barrel, the housing 20 is brought over a barrel 57 and moved downwardly so that the flange 62 moves up into the slot 36 of the housing. The holding member 59 will engage the top 65 of the barrel and move upwardly compressing the spring 83. The pawl 37 will slide over the outer surface 64 of the flange 62.

The housing 20 is then lifted to grip an lift the barrel and the gripping teeth 41 will grip into the outer surface 64 of the flange. As the housing 20 lifts, the holding member 59 will follow the barrel downwardly as it starts to slip downwardly out of the slot thus insuring that the full inner surface 61 of the barrel flange will be engaged by the surface 67 of the holding member. Downward movement of the barrel flange will continue until the teeth 41 firmly grip the barrel and it will be seen that a full and rigid bite on the barrel edge is achieved when the barrel is firmly gripped and the parts are in the position illustrated in FIGURE 3. The holding member 59 will have slid downwardly with respect to the hooked end 35 and will have retained full purchase on the barrel edge.

In gripping a barrel such as 56 which has a rounded bead edge 58, the same function by the holding member 59 is performed. In this case, however, the pawl 57 grips the bead 58 by receiving it in the notch 42. The bead 58 is then firmly held by the holding notch 42 of the pawl 37 and by the holding member 59 which engages the full inner surface 61 of the bead.

The sliding holding member adapts the head to gripping barrels of different size flanges. In FIGURE 3, for example, the holder slides down distance "a" and in FIGURE 4, distance "b," from the hook 35, each time obtaining maximum grip and support for the inside surface of the flange.

Thus I have provided an improved lifting and transporting mechanism with an effective gripping and holding mechanism for the edge of a barrel, which meets the objectives and advantages hereinbefore set forth. An important feature of the invention is the capability of the mechanism of gripping and lifting barrels having a shuttle bead. The mechanism provided has few parts and is relatively simple in construction and assembly.

The gripping and holding mechanism is capable of receiving and gripping barrel flanges of various shapes and sizes and is safe and secure insuring that the barrel will not accidentally slip and fall. Gripping is accomplished automatically with the operator merely setting the housing down upon the edge of the barrel.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. A lifting mechanism for use with transporting trucks or the like comprising a hook-shaped housing having an open downwardly facing guideway slot, a gripping pawl pivotally mounted on the housing with gripping teeth facing said open slot, a holding tooth at the side of the slot opposite the pawl forming a receiving throat therebetween, said tooth having an abutment face facing said throat, means for pivotally supporting the pawl at a location below said abutment face to cause the gripping teeth to move toward said face in moving to a gripping position and away from said face toward a release position, a slide mount for said holding tooth for guiding the tooth in vertical movement parallel to said throat, and spring means biasing said tooth downwardly whereby an article with an upstanding peripheral projection is received in said throat and gripped with the abutment face engaging a maximum surface area of the projection.

2. A lifting mechanism for use with transporting trucks or the like comprising a hook-shaped housing having an open downwardly facing guideway slot, a gripping pawl pivotally mounted on the housing with gripping teeth facing said open slot, a holding tooth at the side of the slot opposite the pawl forming a receiving throat therebetween, said tooth having an abutment face facing said throat, means for pivotally supporting the pawl at a location below said abutment face to cause the gripping teeth to move toward said face in moving to a gripping position and away from said face toward a release position, spring means biasing said pawl toward gripping position, a slide mount for said holding tooth for guiding the tooth in vertical movement parallel to said throat, and spring means biasing said tooth downwardly whereby an article with an upstanding peripheral projection is received in said throat and gripped with the abutment face engaging a maximum surface area of the projection.

3. A lifting mechanism for use with transporting trucks or the like comprising a support member having an open gripping slot for receiving a projection of an article to be gripped and lifted with said article having a surface beside said projection limiting the bite on said projection, a first gripping member at one side of the slot, means supporting the first gripping member for movement toward the slot to a gripping position and away from the slot to a release position, means for moving the first gripping member to gripping position, a second gripping member at the other side of the slot, means supporting the second gripping member at the other side of the slot for movement parallel to the slot, a first article engaging surface on the second gripping member facing in the direction of advancement of the second gripping member toward a gripping position and a second article engaging surface facing the first gripping member, and means for moving the second gripping member to gripping position, said first and second gripping members defining a gripping throat between them whereby the projection of an article can enter the throat and said second article engaging surface moved to be in engagement with said surface of the article and maximum engagement between said first article engaging surface and said projection can be obtained for gripping the article.

4. A lifting mechanism for use with transporting trucks or the like comprising a housing member having an open gripping slot, a gripping pawl pivotally mounted on the housing with a gripping surface facing said slot, means for pivotally supporting said pawl at the side of the slot for pivotal movement toward a gripping position with the gripping surface moving toward said slot or toward a release position, means for moving said pawl to gripping or to release position, a holding tooth at the side of the slot opposite the pawl forming a receiving throat therebetween, said tooth having an abutment face facing said throat, means supporting said tooth for movement parallel to said slot, and means for moving said tooth toward a gripping position on said supporting means toward an article to be gripped whereby the abutment face of the tooth may have maximum gripping surface engagement with a projecting flange on an article to be lifted.

5. A lifting mechanism for use with transporting trucks or the like comprising a housing member having an open gripping slot, a gripping pawl pivotally mounted on the housing with a gripping surface facing said slot, a holding tooth at the side of the slot opposite the pawl forming a receiving throat therebetween, said tooth having an abutment face facing said throat, means supporting said tooth for movement parallel to said slot, and spring means urging said tooth toward a gripping position to move toward a position of maximum engagement between the flange of an article to be gripped and said abutment face.

6. A lifting mechanism for use with transporting trucks or the like comprising a housing member having an open gripping slot, a gripping pawl pivotally mounted on the housing with a gripping surface facing said slot, means for pivotally supporting said pawl at the side of the slot for pivotal movement toward a gripping position with the gripping surface moving toward said slot or toward a release position, means for moving said pawl to gripping or to release position, spring means urging said pawl toward gripping position, a holding tooth at the side of the slot opposite the pawl forming a receiving throat therebetween, said tooth having an abutment face facing said throat, means supporting said tooth for movement parallel to said slot, and means for moving said tooth toward a gripping position on said supporting means toward an article to be gripped whereby the abutment face of the tooth may have maximum gripping surface engagement with a projecting flange on an article to be lifted and the tooth will automatically move from the gripping position when engaged by an article when the flange enters the slot and will follow the article as it moves in a direction to leave the slot when gripped by said pawl.

7. A lifting mechanism for use with transporting trucks or the like comprising a support member having an open gripping slot for receiving a projection of an article to be gripped and lifted with said article having a surface beside said projection limiting the bite on said projection, a first gripping member at one side of the slot, means supporting the first gripping member for movement toward the slot to a gripping position and away from the slot to a release position, means for moving the first gripping member to gripping position, a second gripping member at the other side of the slot, means supporting the second gripping member at the other side of the slot for movement parallel to the slot including a pair of guide bars extending parallel to the slot at the sides of said gripping member, means defining slots at the sides of the gripping member slidably receiving the bars, spring means carried on the support member and urging the second gripping member parallel to the slot toward the slot opening, and a first article engaging surface on the second gripping member facing in the direction of advancement of the second gripping member toward a gripping position and a second article engaging surface facing the first gripping member, whereby the second surface will be held in engagement with an article to be gripped for maximum surface engagement by said first surface with the article.

References Cited in the file of this patent

UNITED STATES PATENTS

| | | |
|---|---|---|
| 815,452 | Maynard | Mar. 20, 1906 |
| 1,772,224 | Peterson | Aug. 5, 1930 |
| 2,360,602 | Waldrup | Oct. 17, 1944 |
| 2,646,307 | Phalin | July 21, 1953 |
| 2,647,007 | Gmoser et al. | July 28, 1953 |
| 2,689,663 | Shramek | Sept. 21, 1954 |